(12) United States Patent
Pacull

(10) Patent No.: US 8,046,002 B2
(45) Date of Patent: Oct. 25, 2011

(54) APPARATUS FOR BROADCASTING REAL TIME INFORMATION TO GPS SYSTEMS

(75) Inventor: Francois Pacull, Crolles (FR)

(73) Assignee: Xerox Corporation, Norwalk, CT (US)

( * ) Notice: Subject to any disclaimer, the term of this patent is extended or adjusted under 35 U.S.C. 154(b) by 600 days.

(21) Appl. No.: 12/181,494

(22) Filed: Jul. 29, 2008

(65) Prior Publication Data

US 2010/0029219 A1     Feb. 4, 2010

(51) Int. Cl.
*H04W 24/00*     (2009.01)
*H04L 29/06*     (2006.01)

(52) U.S. Cl. ............... 455/456.3; 455/456.1; 455/414.3

(58) Field of Classification Search ............... 455/456.1, 455/456.3, 414.1, 414.2, 414.3; 340/995.13, 340/905; 701/200, 202, 213
See application file for complete search history.

(56) References Cited

U.S. PATENT DOCUMENTS

| | | | |
|---|---|---|---|
| 6,129,025 A | 10/2000 | Minakami et al. | |
| 6,393,362 B1 | 5/2002 | Burns | |
| 6,405,132 B1 | 6/2002 | Breed et al. | |
| 6,590,507 B2 * | 7/2003 | Burns | 340/995.13 |
| 7,117,087 B2 * | 10/2006 | Jung et al. | 701/213 |
| 7,209,831 B2 | 4/2007 | Hilliard et al. | |
| 7,317,987 B2 | 1/2008 | Nahla | |
| 7,343,238 B2 | 3/2008 | Nou et al. | |
| 7,418,346 B2 | 8/2008 | Breed et al. | |
| 7,462,437 B2 * | 12/2008 | Hoshi et al. | 430/270.1 |
| 7,467,180 B2 * | 12/2008 | Kaufman et al. | 709/201 |
| 7,565,153 B2 * | 7/2009 | Alcock et al. | 455/456.1 |
| 7,698,063 B2 * | 4/2010 | Kim | 701/211 |
| 2004/0181338 A1 | 9/2004 | Dobler et al. | |
| 2005/0107954 A1 | 5/2005 | Nahla | |
| 2005/0143918 A1 | 6/2005 | Hilliard et al. | |
| 2007/0021915 A1 | 1/2007 | Breed et al. | |

FOREIGN PATENT DOCUMENTS

| | | |
|---|---|---|
| DE | 4434789 | 4/1996 |
| DE | 10128792 | 11/2002 |
| EP | 679974 | 11/1995 |
| EP | 936520 | 6/2002 |
| EP | 1726513 | 11/2006 |
| GB | 2373117 | 9/2002 |
| GB | 2405279 | 2/2005 |
| JP | 2008108086 | 5/2008 |
| WO | WO2003081514 | 10/2003 |

* cited by examiner

*Primary Examiner* — Sonny Trinh

(74) *Attorney, Agent, or Firm* — Fay Sharpe LLP

(57) ABSTRACT

A system is described herein to broadcast real time information to a particular area. An area of interest is defined by a geographic locale and a remote station monitors activity within the area of interest The remote station includes a monitoring component that monitors events within the area of interest. A protocol converter receives data from the monitoring component to invert data received into one or more standards or protocols. A broadcast element receives data from the protocol converter and emits data within a broadcast radius that is proximate to the area of interest.

20 Claims, 7 Drawing Sheets

APPARATUS FOR BROADCASTING REAL TIME INFORMATION TO GPS SYSTEMS

BACKGROUND

The present exemplary embodiments relate to monitoring real time events. They find particular application in conjunction with monitoring such events and providing this information to a geographic region. In one embodiment, a remote station monitors an area of interest to broadcast information associated therewith to users within a broadcast radius. However, it is to be appreciated that the present exemplary embodiments are also amenable to other like applications.

Today's motorist encounters a variety of different obstacles and encumbrances while travelling. Generally, such obstacles are observed first hand by the naked eye. In order to facilitate additional sources of information for the motorist, various devices have been implemented along roadways to enhance visibility and the ability for motorists to avoid such obstacles. In one example, a mirror can be positioned at an intersection in order to allow a motorist travelling in one direction to observe whether or not one or more disparate motorists are travelling along a road which intersects therewith. Such a mirror or similar device can be useful especially if a building or other structure obstructs the view of the motorists from each other.

There are, however, several shortcomings to utilizing a mirror or similar device. In most cases, the vision is one way. Motorists on a secondary road can see if a vehicle or other mobile object is currently on the main road. However, it may be impossible to have any information when you are on the primary road. In addition, the driver has to interpret the image seen into the mirror to define the direction and the distance of the motorists therein. This information depends on several parameters. The angle of the mirror, its reflective properties and the current location of the driver all contribute to the size and location of images that appear on the mirror and presented to the motorist. The angle of the mirror and its reflection properties are not the same from one mirror to another and can vary greatly depending on manufacture, mirror type, etc. The location of the driver will also vary as the motorist is travelling down a roadway and will affect the image presented to the motorist to provide accident prevention information. Thus, current apparatuses utilized to aid motorists in preventing accidents or to provide real time information is inadequate and unreliable.

What are needed are systems and methods that provide real time information to a motorists or other mobile user in a reliable fashion.

SUMMARY

In one aspect, a system is described herein to broadcast real time information to a particular area. An area of interest is defined by a geographic locale and a remote station monitors activity within the area of interest. The remote station includes a monitoring component that monitors events within the area of interest. A protocol converter receives data from the monitoring component to invert data received into one or more standards or protocols. A broadcast element receives data from the protocol converter and emits data within a broadcast radius that is proximate to the area of interest.

In another aspect, a system communicates real time information within a region to one or more local regions. A remote interface receives information from one or more outside sources. A dispatch component receives information from the remote interface and broadcasts the received information to a geographic region. One or more remote stations located within the region receive information broadcast from the dispatch component. The remote station includes a monitoring component that monitors information within an area of interest. A protocol converter converts information from the monitoring component into one or more protocols. A broadcast element broadcasts information from the protocol converter to a radius therefrom.

In yet another aspect, a method is employed to display real time information on an interface. Real time events are monitored within an area of interest. The events monitored are recorded in real time and event data is converted to one or more particular protocols. Event data is transmitted via the one or more protocols to a broadcast radius. The event information is received via a display within the broadcast radius and decoded and displayed on an interface.

DETAILED DESCRIPTION

Figure 1:
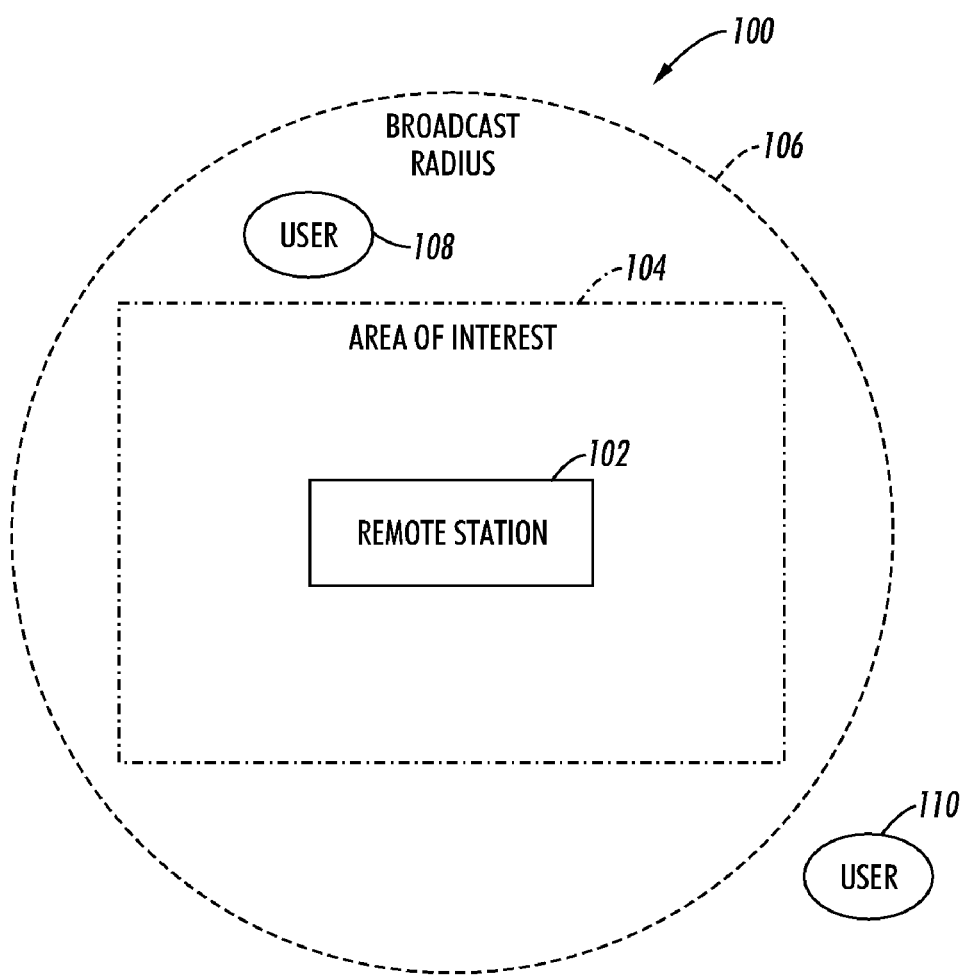
FIG. 1 illustrates a system employed to broadcast information related to an area of interest within a radius, in accordance with an exemplary embodiment.

FIG. 1 illustrates a system that includes a remote station 102 that monitors an area of interest 104 to provide real time information to one or more users. The remote station 102 broadcasts this real time information to a radius 106. The radius 106 can be a function of the strength of transmission of data from the remote station 102. In one example, a short range radio transmitter can be employed to broadcast the real time data in a radius of approximately 100 meters. It is to be appreciated, however, that any suitable wireless communication system is contemplated.

A user 108 and a user 110 are mobile users within a proximity of the broadcast radius 106. The user 108 is within the broadcast radius 106 and the user 110 is outside the broadcast radius 106. In this example, the user 108 will receive data transmitted from the remote station 102 since he is within the broadcast radius 106. In contrast, the user 110 will not receive data transmitted from the station 102 since he is outside the broadcast radius 106. This communication architecture facilitates users that are proximate to the area of interest 104 to receive information related thereto. In this manner, users that are approaching or are proximate to the area of interest 104 are the only users that require information related to an area of interest.

The size of the broadcast radius 106 can be commensurate with the power provided to the remote station 102. In one example, the power provided to the remote station is low in order to insure that the remote station can be self-sufficient and placed into substantially any location wherein municipal power may not be available. In one example, the remote station is powered via a natural power supply such as water, wind or solar energy. The size of the broadcast radius 106 and power supplied to the remote station 102 may be limited.

The broadcast radius 106 can be a function of the area of interest 104 such that the broadcast radius is greater than the area of interest 104 in terms of area. In this regard, the users 108, 110 can learn of information relative to the area of interest 104 before entering the area of interest 104. In one example, the broadcast radius is greater than the area of interest 104. The area of interest 104 can be substantially any geographic locale such as an intersection of a primary road and a secondary road within a highway system.

The intersection of the primary road and the secondary road may include an obstacle that prevents motorists on the primary road from observing motorists on the secondary road. In this manner, the motorists on the primary road and the secondary road are required to assume that a motorist is not approaching the intersection as they proceed down the respective roads. However, proceeding in such a manner may lend itself to a greater occurrence of accidents occurring from a collision between motorists on the primary road and the secondary road since they are unable to see each other until it is too late for an accident to be avoided. Accordingly, the remote station can transmit real time information related to the area of interest to the users 108, 110 that can review the data emitted from the remote station 102 via a display (not shown) or other means that provide the information to the users as they travel through the system 100.

The remote station 102 can monitor real time events within the area of interest 104 and transmit information related to those events via a wireless protocol. The wireless protocol employed by the remote station 102 can be a Bluetooth protocol, a 802.11 protocol or any short range transmission standard known in the art. In one example, the remote station 102 employs a short range radio transmission to deliver real time data to all points within the broadcast radius 106. The wireless protocol utilized by the remote station is not critical and is well known in the art. For the sake of brevity, the types of protocols will not be discussed further herein.

In order to monitor real time information, the remote station 102 can be substantially any real time monitoring device including a camera, a position monitoring system, telemetry equipment, laser equipment, a vision system or other similar devices that can monitor and track moving objects within the area of interest 104. Alternatively, or in addition, the remote station can be a blind node that receives information from one or more disparate sources and broadcasts such outside information to the broadcast radius 106. In this example, the information is not gathered by the remote station 102 but rather from an external source such as a municipality or private user that wishes such information to be sent throughout the broadcast radius 106. The remote station 102 can also employ a processor or other means to interpret the movement, direction, speed, etc. of objects in order to properly convey the information associated therewith. In one example, pixel counting and detection within a field of view is processed utilizing a vision system. In another example, outside information sent to the remote station 102 can include real time events that are not related to motion within the area of interest. Such events can include a fire, a crime scene, a flood, a water main break, etc. that can occur within the area of interest 104. In yet another example, the remote station 102 can receive outside advertising information related to businesses or other channels of commerce within the broadcast radius 106 to present to users located therein. In this manner the remote station 102 can convey substantially any type of real time information to users within the broadcast radius 106 such that they are made aware of this information as they travel through the radius 106.

It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The processing component can employ an exemplary environment such as a computer that includes a processing unit (not shown), a system memory (not shown), and a system bus (not shown) that couples various system components including the system memory to the processing unit. The processing unit can be any of various commercially available processors. Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The computer can further include a hard disk drive, a magnetic disk drive, e.g., to read from or write to a removable disk, and an optical disk drive, e.g., for reading a CD-ROM disk or to read from or write to other optical media. The computer typically includes at least some form of computer readable media. Computer readable media can be any available media that can be accessed by the computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM, including an operating system, one or more application programs, other program modules, and program non-interrupt data. The operating system in the computer can be any of a number of commercially available operating systems.

A user may enter commands and information into the computer through a keyboard (not shown) and a pointing device (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus ("USB"), an IR interface, etc. A monitor (e.g., the display 116), or other type of display device, is also connected to the system bus via an interface, such as a video adapter (not shown). In addition to the monitor, a computer typically includes other peripheral output devices (not shown), such as speakers, printers etc.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Figure 2:
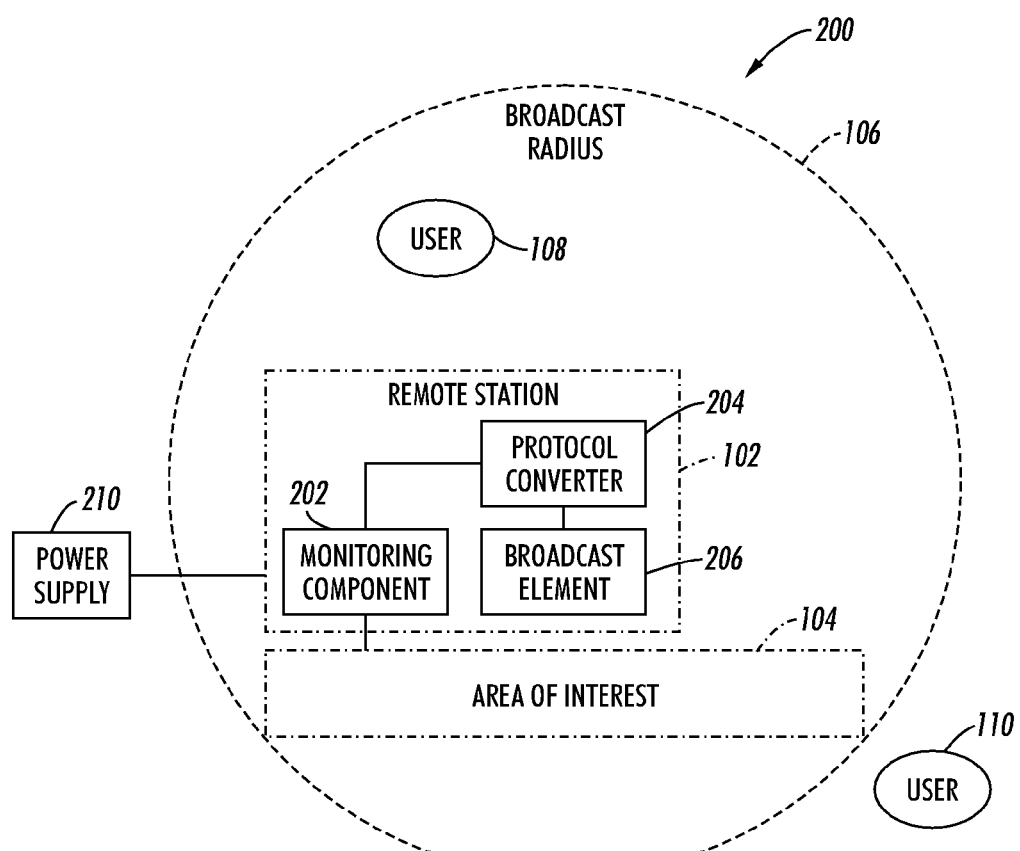
FIG. 2 illustrates a system utilized to broadcast information within a radius that includes a monitoring component and a broadcast element, in accordance with an exemplary embodiment.

Turning now to FIG. 2 which illustrates the system 200 that includes the remote station 102, which monitors the area of interest 104. The remote station 102 broadcasts real time information related to the area of interest 104 within the broadcast radius 106. This real time information is provided to users within the broadcast radius, such as the user 108 and not to users outside the broadcast radius, such as user 110.

The remote station 102 includes a monitoring component 202 that monitors activity within the area of interest 104. A protocol converter 204 receives information from the monitoring component 202, translates it into a preferred protocol and broadcasts this information throughout the radius 106 via a broadcast element 206. A power supply 210 is employed to provide necessary power to the remote station 102. The monitoring component 202 can be representative of a single device or a plurality of devices that are located proximate to or within the area of interest 104. In one example a plurality of devices may be desired in order to adequately monitor real time events that occur within the area of interest 104. In one example, the monitoring component is one or more cameras that reside within the area of interest 104 to monitor a particular event. The device(s) that comprise the monitoring component 202 can be controlled by a processing component (not shown) that can synchronize the monitoring functionality of each of the devices within the monitoring component 202.

The protocol converter 204 can allow the monitoring component 202 to interface to substantially any type of broadcast element 206 and thereon to substantially any receiving device that may be employed by the users 108 or 110. In one example, the protocol converter 204 can convert information from the monitoring component 202 into a format that can be received and decoded by a GPS system. In another example the protocol converter can provide data to the broadcast element 206 in a protocol that conforms to a Bluetooth and/or an 802.11 standard.

The broadcast element 206 can be employed to receive data from the protocol converter 204 for wireless transmission throughout the broadcast radius 106. The broadcast element can be substantially any type of device which can transmit information wirelessly, such as a short range emitter. In one embodiment, the short range emitter is a radio capable of emission within a few hundred meters from the remote space in 102. Alternatively, or in addition, the broadcast element 206 can transmit data within an area that is commensurate with the amount of power received from the power supply 210. In other examples, the broadcast element 206 emits signals that conform to substantially any WI-FI and/or wireless application protocol, and/or wireless internet protocol. In addition, the broadcast element can employ one or more cellular technologies such as CDMA and GSM technologies and/or site any substantially any cellular internet protocol.

The power supply 210 can be a self-contained unit capable of operation in remote areas that require a minimal amount of maintenance. The power supply can be, for example, a solar power supply device, a wind power supply device, a hydro-electric power supply device, and the like wherein power is derived from a natural source and stored in an energy containment device, such as a battery. In this manner, energy accumulated within the power supply 210 can be delivered to the remote station 102. In one embodiment, the requirements for power delivery from the power supply 210 are low since the broadcast radius 106 is confined to the area of interest 104 or an area approximately the size of the area of interest. Keeping the power requirements for the power supply low allows for a low transmission broadcast from the broadcast element 206 and allows the cost of the system 200 to remain minimal. By keeping the cost of the system 200 low, a plurality of systems can be deployed throughout a particular region in order to provide real time information to users travelling therein.

Figure 3:
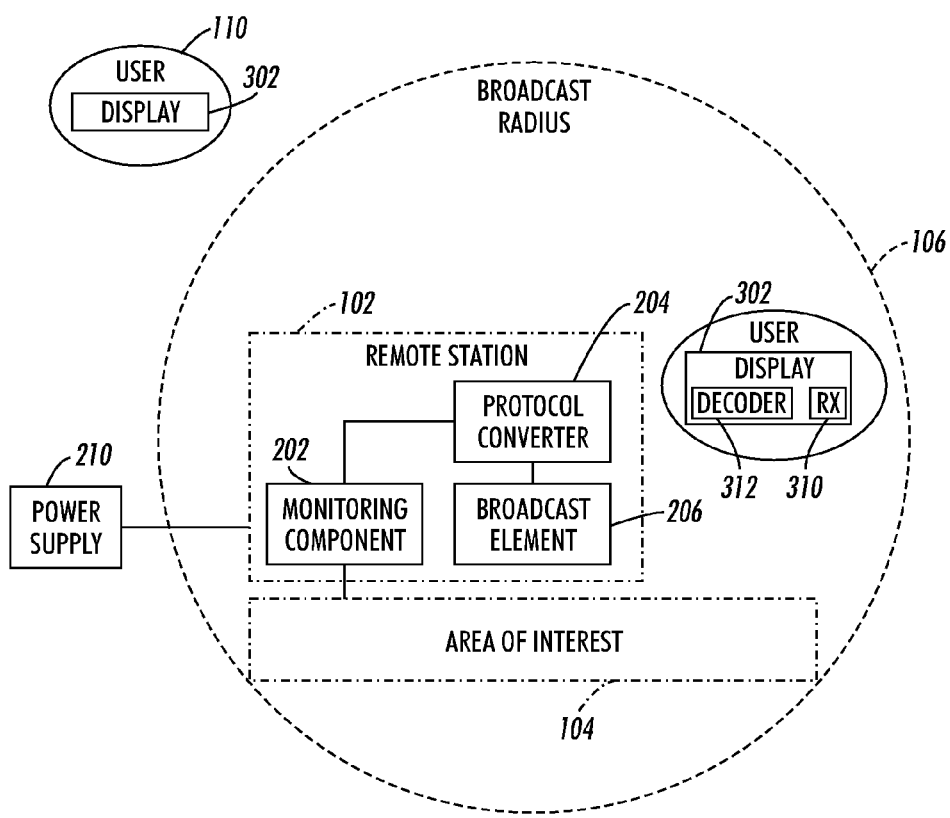
FIG. 3 illustrates a system utilized to broadcast information related to an area of interest in a broadcast radius utilizing a display, in accordance with an exemplary embodiment.

Turning now to FIG. 3 which illustrates a system 300 that includes a display 302 and a display 304 that are employed with the users 108 and 110 respectively. The display 302, 304 can include a receiving element 310 and a decoding element 312. The receiving element 310 can recognize and convey signals transmitted to the user 108. The signals captured by the receiving element 310 are decoded via the decoding element 312 for presentation on the display 302. The decoding element 312 can utilize a number of protocols to properly decode the real time information sent by the remote station 102.

The display 302 can include substantially any type of LCD, plasma screen, CRT, etc. device capable of presenting electronic data to a user. Alternatively, or in addition, the display 302 can be capable of presenting information in color, black and white or monochrome and can also include the ability to send audio signals to the user. The display 302 can be portable in size such that it can be mounted within a vehicle employed by a user, such as the user 108. In one example, a portable GPS system can be mounted to the user's vehicle wherein a touch screen can be employed to interface with the display 302.

The display 302 can include any number of peripheral devices in order to communicate with a display in order to present appropriate content thereon. In one example, the display 302 utilizes a touch screen to allow a user to navigate throughout a plurality of menus in order to provide a presentation of data in a desired format and/or location within the display 302. In addition, the display 302 can allow a user to define predetermined directions related to various information types received from the remote station 102. In one example, the display can allow a user to modify a color or to sound an auditory alarm when a predefined threshold has been passed.

The display 302 can present a map of a particular area, such as the area of interest 104 for viewing by the user 108, 110. The information displayed on the map can be related to vehicles moving within the area of interest on one or more roadways contained therein. In this manner, vehicles located on the roadways within the area of interest 104 can be presented as moving pixilated objects within the display 302. The pixilated objects can move at a speed within the display that is commensurate with a speed identified via the real time monitoring provided by the monitoring component 202. In addition, the pixilated object on the display 302 can be a size that is relative to the size of the actual vehicle and/or other object moving within the area of interest 104. The pixilated object can change color and/or size within the display 302 when a predetermined threshold has been exceeded. In this regard, the user 108, 110 may be able to notice when a vehicle is within a particular proximity of the user's vehicle. In addition, once this threshold has been exceeded, an auditory alarm can be provided to the user in order to alert the user that an accident may be imminent. By providing a visual and/or auditory alarm to the user, collisions with other motorists can be avoided.

Figure 4:
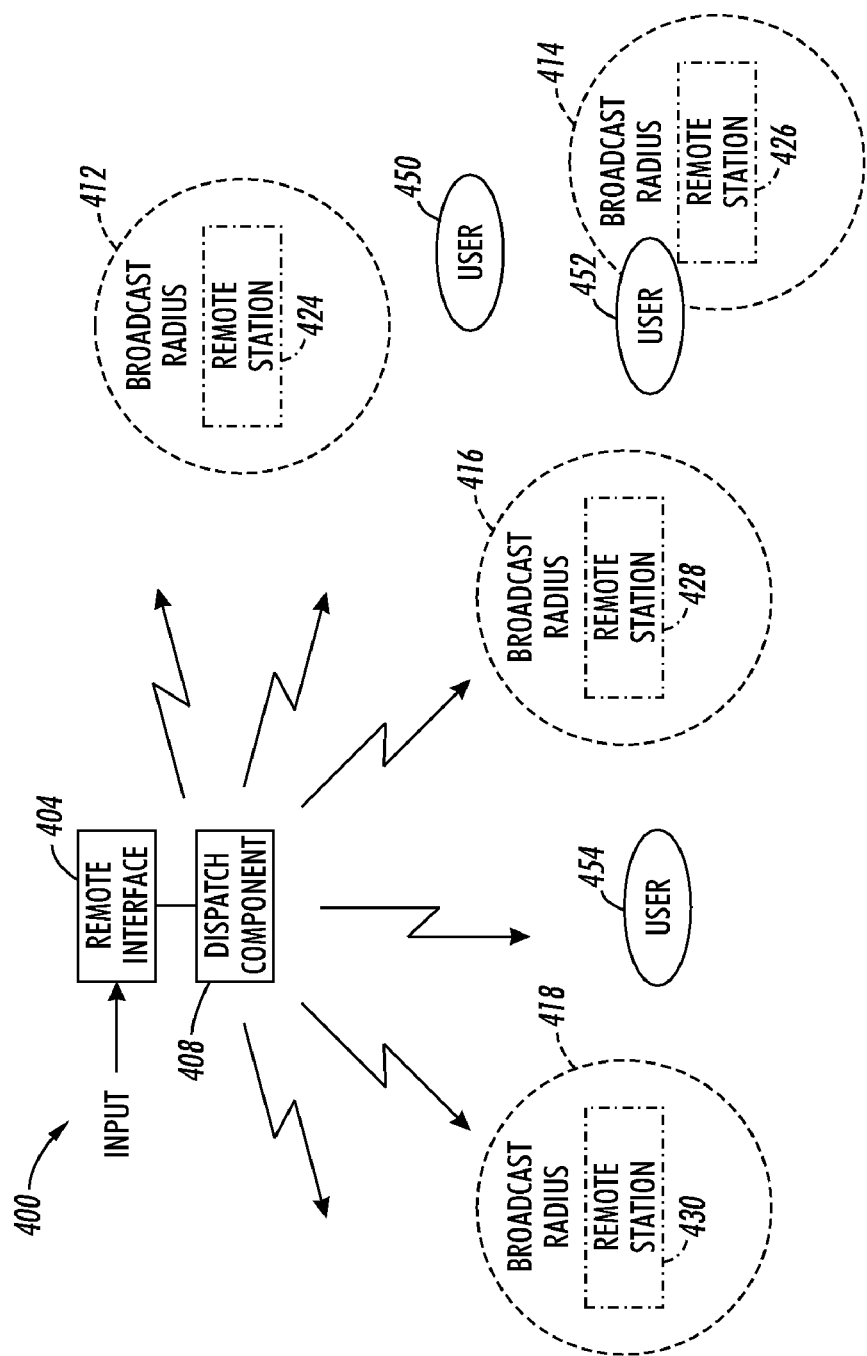
FIG. 4 illustrates a system utilized to broadcast information to a plurality of remote stations, in accordance with an exemplary embodiment.

Referring now to FIG. 4 which illustrates a system 400 that includes a remote interface 404 that receives input from an outside source. A dispatch component 408 receives information transferred from the remote interface 404 and broadcasts that to a plurality of remote stations 424, 426, 428 and 430 within the system 400. Each of the remote stations 424-430 broadcasts the information received from the dispatch component 408 within a broadcast radius 412, 414, 416 and 418, respectively. In this manner information received from the dispatch component 408 can be disseminated and retransmitted throughout the system 400.

Users 450, 452 and 454 move throughout the system 400 and can receive information from the dispatch component 408. The users 450-454, however, will receive information only if they are within the broadcast radii of the remote stations 424-430. Accordingly, the users 454 and 450 will not receive information from the remote station since they are outside of any broadcast radii therein. The user 452, however, will receive information from the remote station 426 since the user 452 is within the broadcast radius 414. The remote station 426 can transmit information from the dispatch component 408 and/or information received from an alternative source such as a local input station (e.g. the monitoring component 202).

Information can be input into the remote interface 404 from substantially any outside source. In one example, information is input from a local law enforcement agency related to a real time event that is occurring within one of the broadcast radii 412-418. In this manner, the dispatch component 408 can be suitably programmed to transmit information only to those remote stations that pertain to the real time event received via the remote interface 404. Alternatively, or in addition, each of the remote stations 424-430 can receive information broadcast from the dispatch component 408 and utilize local processing to determine whether such information should be broadcast throughout each of their respective broadcast radii. Accordingly, the data input into the remote interface 404 can be tagged for appropriate dissemination throughout the system 400 which can be related to a geographic location, event type, etc.

In addition, the information received via the remote interface 404 can be set to various priority levels of transmission. Information tagged as important can receive a higher importance rating then other information and can be first broadcast to users throughout the system 400 previous to non-important transmissions. In another embodiment, the information can be received and displayed to the users 450-454 in a larger font in association with an auditory alarm, etc. to inform the users 450-454 that such information has greater significance than other information that they may receive.

The dispatch component can be a high power radio transmitter that is located centrally within a geographic area in order to facilitate transmission of information throughout the system 400. Other information can be received via the remote interface 404 such as advertising of local businesses located within each of the respective broadcast radii 412-418 within the system 400. Thus, if the users 450-454 can be informed of local business locations and/or special pricing in order to attract the users 450-454 as they are travelling through each of the respective radii 412-418. In one example, the displays utilized by the users 450-454 can include a specific field that is utilized for advertising content. Additionally, the display can include a field specifically for real time events such as fires, floods, traffic jams, water main breaks, or other natural disasters that may occur within each of the broadcast radii 412-418. Yet another field can be employed to display real time events as they occur on a GPS system, wherein the movement of disparate vehicles within a broadcast radii is displayed as a moving pixilated objected within the confines of a roadway or other artery of travel.

Figure 5:
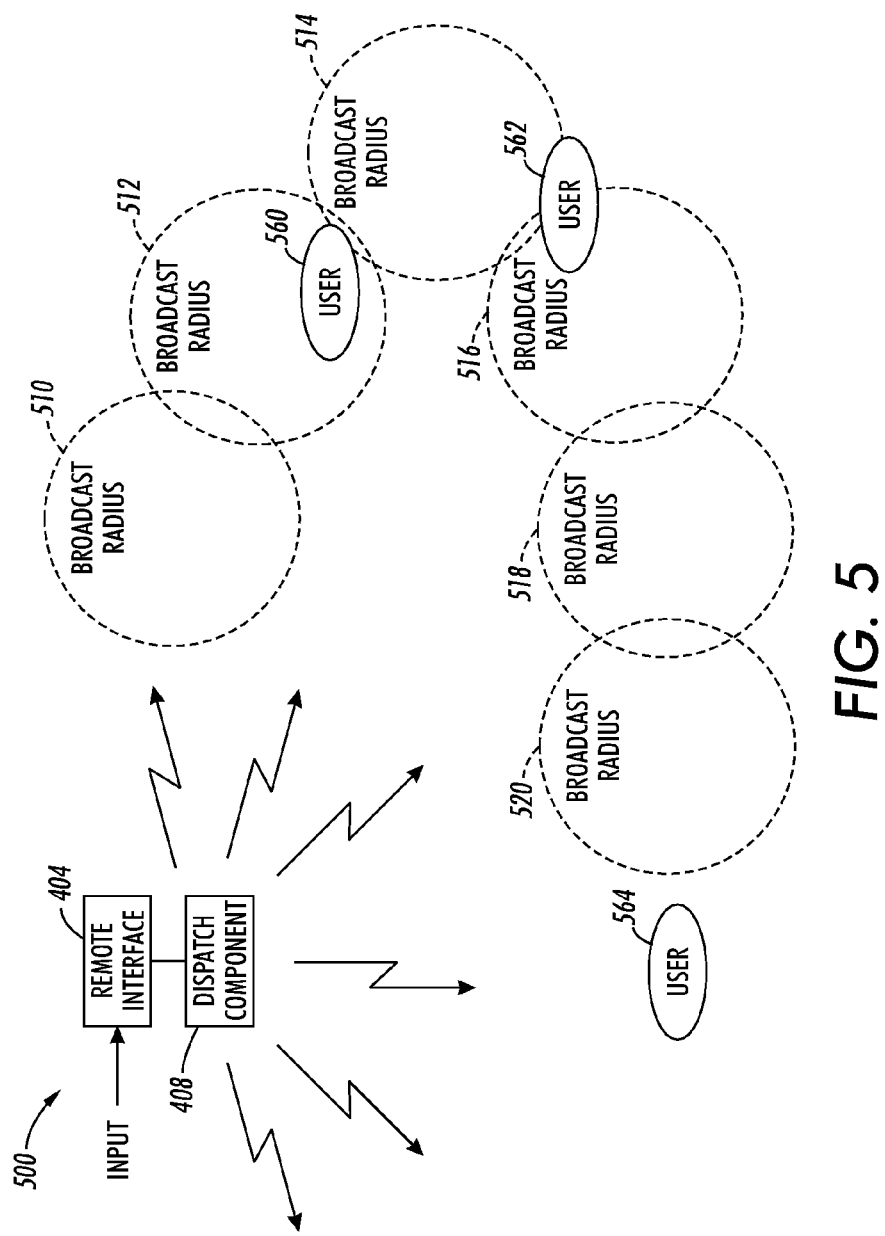
FIG. 5 illustrates a system utilized to broadcast information to a plurality of disparate areas which are adjacent to one another, in accordance with an exemplary embodiment.

Referring now to FIG. 5 which illustrates a system 500 to provide information locally throughout main transportation thoroughfares within a particular region. The remote interface 404 receives input from an outside source which is broadcast to the region via the dispatch component 408. The system 500 includes a plurality of broadcast radii 510, 512, 514, 516, 518 and 520 that are congruent to a particular area within the system 500, such as a highway utilized by motorists for travel. Users 560, 562 and 564 travel throughout the system 500 and through the regions covered by the broadcast radii 510-520.

The users 560, 562 are within broadcast radii within the system 500. The user 560 is within both the broadcast radii 512 and 514. Similarly, the user 562 is within the broadcast radius 516 and 518. As such, the users 560, 562 can receive information from that is broadcast within each of the respective radii to provide them with real time information as they travel through the system 500. By overlapping the broadcast radii, a user can constantly be informed of any upcoming or local events of interest that can help the users 560, 562 to make informed decisions as they navigate throughout the system 500. As discussed above, the information provided to the users 560-564 can be related to traffic information, local advertising, natural disasters and/or disparate motorists travelling in close proximity to the users in order for them to respond appropriately.

In one example, the users 560, 562, and 564 may not be able to see on-coming traffic from one or more disparate roadways and such information can be displayed on a GPS or similar display within a motorist's vehicle. In addition, alarms or other notification methodologies can be employed to provide the users 560-564 with real time information to enhance their driving experience. As the broadcast radii 510-520 are overlapped there is never a time when the users 560-564 of the system 500 are without information.

Figure 6:
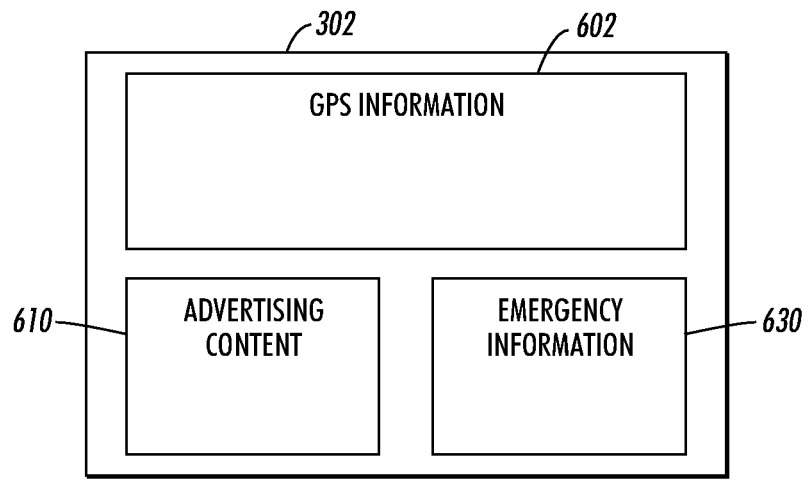
FIG. 6 illustrates a display that can receive real time information from the remote station and/or broadcast component, in accordance with an exemplary embodiment.

FIG. 6 illustrates the display 302 in greater detail. The display 302 can include a plurality of fields 602, 610 and 630 each of which can display specific content to a user. In this manner, the information received by the receiving element 310 and decoded by the decoding element 312 can be presented in an organized fashion based on the type of information received. Each of the fields 602, 610 and 630 can be in substantially location within the display 302 and can be substantially any size. The configuration illustrated herein is for exemplary purposes only.

The field 602 can be utilized to provide GPS related content to a user. The GPS related content can display roadways, lakes, green areas, etc. within a particular geographic area. The GPS field 602 can also illustrate location the location of the GPS device (e.g. presumably in an automobile) relative to other structures and/or vehicles within the same geography. The GPS field 602 can further display disparate motorists, their locations within the geographic area and their speed relative to the speed of the vehicle in which the GPS is located. In this manner, if the GPS user and a disparate user are moving toward the same point in space the driver can make an informed decision as to how to proceed as they approach that point.

In addition, if one or more parameters have been exceed, such as speed, location etc., the GPS can provide a warning of the same to the user. Such a warning can be displayed via variety of colors such as red or yellow and/or larger font displays and/or auditory alarms that can inform a user that a disparate motorist is too close or travelling at a high rate of speed. The users modify their behavior based on such information to prevent a collision or other accident from occurring. If an alarm is exceeded, one or more of a color flashing, an auditory alarm, a voice alarm and a video blip can be activated.

It is to be appreciated the GPS field 603 generally presents information to a user from a first person perspective. That is, that the movement of disparate vehicles or other objects within the geography are all relative to the movement of the GPS within the same space. Alternatively, or in addition, the perspective can be modified by the user via an input (not shown) within the display 302 to provide second person perspectives for motion within an areas.

The field 610 can be located adjacent to the field 602 and provide content associated with advertising. Such advertising content can include logos, tag lines, video coupons, etc. that relate to businesses within broadcast radii in which the user is travelling. Such advertising can be presented to the user based on location within a particular broadcast radii. That is, if the user is in proximity to one business, advertising can appear within the field 610 to provide information related thereto. In this manner users within the broadcast radii utilizing the displays 302 can be made aware of local businesses and/or specials related thereto in order to attract users to conduct business with such advertisers.

The field 620 can be located proximate to the field 602 and 610 to provide content related to real time emergencies and/or traffic conditions that are occur within a broadcast radius and/or area of interest. Such emergency information can be related to traffic conditions that are unfavorable, flooding and/or fires and/or crimes that may have occurred within a particular area of interest and which the user may wish to avoid. Such emergency information can be provided via a municipality or other entity that is familiar with the local conditions that a motorist may wish to avoid. Providing such emergency information can allow a user to seek an alternative route to travel to their particular destination.

Figure 7:
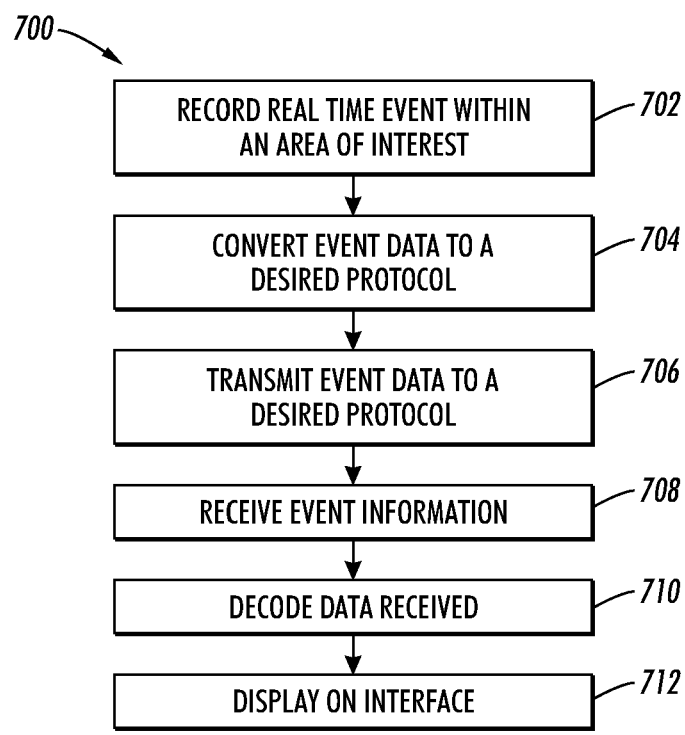
FIG. 7 illustrates a method utilized to display real time information on an interface, in accordance with an exemplary embodiment.

FIG. 7 illustrates a methodology to display information on an interface. At reference numeral 702 a real time event is recorded within an area of interest. Such recordation can occur via video or similar equipment and/or it can be recorded via weather monitoring equipment. Real time event recordation can also occur from an outside source that can provide such information that is occurring within an area of interest. This information can include real time event disaster notifications and/or traffic conditions that are unfavorable to a user. A broadcast radius for appropriate consumption and display of this information to a user. At 706, the event data is transmitted via the desired protocol.

At 708, event information is received by a display or other receiving means. At 710, data received is decoded and, at 712, this data is displayed on an interface. Receiving and decoding data can be facilitated via any radio or similar protocol for data reception. The decoding of the data can be accomplished utilizing known protocols such as Bluetooth, 802.11 standards and/or cellular or GPS standards known in the art. Information can be displayed on an interface in substantially any fashion. In one example, the information is organized and presented in disparate fields within the display in order to allow a user to review such information in a compartmentalized fashion. Such fields can be separated into three categories: real time GPS information, advertising information, and emergency information. Additionally, alarms or other means can be employed to alert a user of various conditions that occur relative to each data type.

Figure 8:
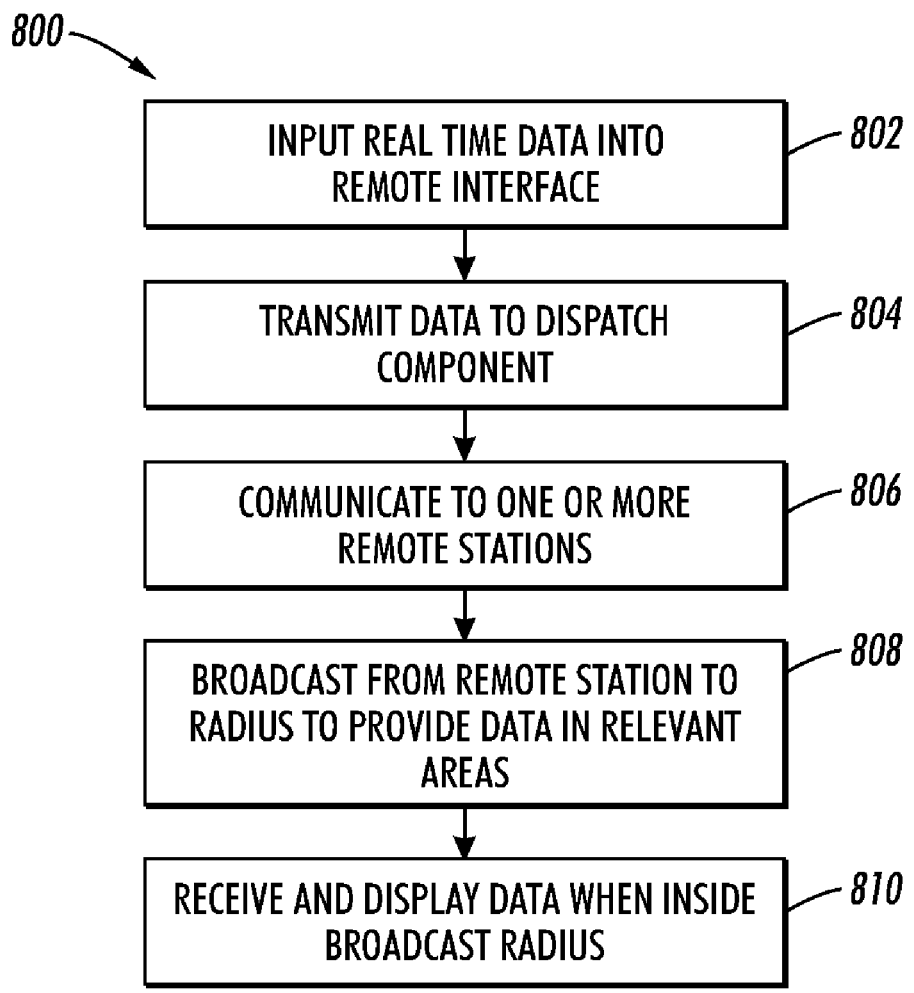
FIG. 8 illustrates a method to receive and display data when inside a broadcast radius, in accordance with an exemplary embodiment.

FIG. 8 illustrates a methodology 800 to receive and display data when inside a broadcast radius. At 802, real time data is input into a remote interface. Such data can relate to real time events such as traffic conditions, natural disaster occurrences and/or advertising content. At 804, this data is transmitted to a dispatch component and, at 806, the information is communicated to one or more remote stations. The dispatch component can be a high powered radio transmitter that broadcasts this information within a particular region. The remote stations can be located in disparate location throughout a region and accept such data via a dispatch component. At 808, data from the remote station is broadcast to a radius to provide data therein. The data broadcast from the remote station is generally performed via a low power radio emitter that provides information within a short radius (e.g., 80 to 100 meters from the remote station). In this manner, only users within a close proximity to the remote station have access to and can review data transmitted therefrom.

At 810, information is received and displayed to a user when they are inside the broadcast radius. In one example, this information can be provided to the user via a display mounted within a vehicle. This display can include a plurality of fields that can display specific content related to real time events including GPS information, real time disaster information and/or emergency information. Information can be transmitted and received via any known wireless protocol such as wireless Ethernet, Bluetooth, 802.11, a WAP protocol, cellular technologies and the like.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system utilized to broadcast real time information to a particular area, comprising:
   an area of interest which is defined by a geographic locale;
   a remote station that monitors activity within the area of interest, wherein the remote station includes a monitoring component that monitors events within the area of interest;
   a protocol converter that receives data from the monitoring component to invert data received into one or more standards or protocols;
   a broadcast element that receives data from the protocol converter and emits data within a broadcast radius that is proximate to the area of interest; and,
   a display, the display decoding captured signals and using the signals to determine if a threshold representing at least one event desired to be identified is exceeded, the display presenting a representation of the at least one event on a map in at least one of a select size and color based on the determination and changing the at least one select size and color based on a change in the determination.

2. The system according to claim 1, further including:
   a power supply that provides power to the remote station.

3. The system according to claim 1, wherein power generated by the power supply is from natural means including at least one of a water flow, an air flow, and a solar energy.

4. The system according to claim 1, wherein the broadcast element is a low power radio transmitter.

5. The system according to claim 1, wherein the monitoring component is at least one of a video camera, a vision system, a telemetry system, a motion detector, a laser detector and a radar detector.

6. The system according to claim 1, wherein the protocol converter converts data from the monitoring component utilizing at least one of a GPS standard, a cellular standard, a Bluetooth standard, a WAP standard and a wireless Ethernet standard.

7. The system according to claim 1, wherein the display receives information from the broadcast element and displays such information in a real time presentation.

8. The system according to claim 7, further including:
   a receiving element that receives data from the broadcast element; and
   a decoding element that decodes information received by the receiving element and presents such decoded information for presentation on the display.

9. The system according to claim 8, wherein the data is provided by a GPS, wherein location and speed associated with moving objects within the area of interest are displayed commensurate with the location and speed on the display.

10. The system according to claim 1, wherein the display activates one or more alarms when a predetermined threshold has been exceeded.

11. The system according to claim 10, wherein the alarms are presented via at least one of a color flashing, an auditory alarm, a voice alarm and a video blip.

12. The system according to claim 1 wherein the display component is a GPS system.

13. A system that communicates real time information within a region to one or more local regions, comprising:
   a remote interface that receives information from one or more outside sources;
   a dispatch component that receives information from the remote interface and broadcasts the received information to a geographic region; and
   one or more remote stations located within the region that receive information broadcast from the dispatch component, the remote station includes,
      a monitoring component that monitors information within an area of interest,
      a protocol converter that converts information from the monitoring component into one or more protocols;
      a broadcast element that broadcasts information from the protocol converter to a radius therefrom; and,
      a processor that determines whether to broadcast an event alert based on a rating of the event, wherein the information includes a tag related to a priority level of the event.

14. The system according to claim 13, wherein the dispatch component broadcasts information to all remote stations within the region and information only pertaining to a particular remote stations or stations is rebroadcast to a corresponding radius.

15. The system according to claim 13, wherein the data transmitted from the dispatch component includes one or more identifying tags to designate one or more remote stations to broadcast the information received from the dispatch component.

16. The system according to claim 13, wherein information input into the remote interface is at least one of an advertisement, emergency information, natural occurrence information and natural disaster information.

17. The system according to claim 13, wherein the dispatch component categorizes information from the remote interface based on or more of advertising content, natural disaster content, and real time GPS information.

18. The system according to claim 13, wherein a user that is outside of a broadcast radius relevant to a remote station does not receive information emitted from the remote station.

19. The system according to claim 13, wherein a display shows speed and location in a GPS field of one or more disparate moving objects representing events within the field that may potentially affect a mobile user moving through the field.

20. A method to display real time information on an interface, comprising:
   monitoring real time events within an area of interest;
   recording the events monitored in real time;
   converting event data to one or more particular protocols;
   transmitting event data via the one or more protocols to a broadcast radius;
   receiving event information via a display within the broadcast radius;
   decoding data received by a display;
   determining if the data exceeds a threshold; and
   displaying the real time event data on an interface in a first color and first size if the threshold is met and in a second color and second size if the threshold is not met, wherein at least one of the first color and first size is different from a corresponding one of the second color and second size.

* * * * *